Jan. 30, 1962   R. E. DIESTERWEG   3,018,602
LAWN EDGER
Filed Jan. 26, 1959
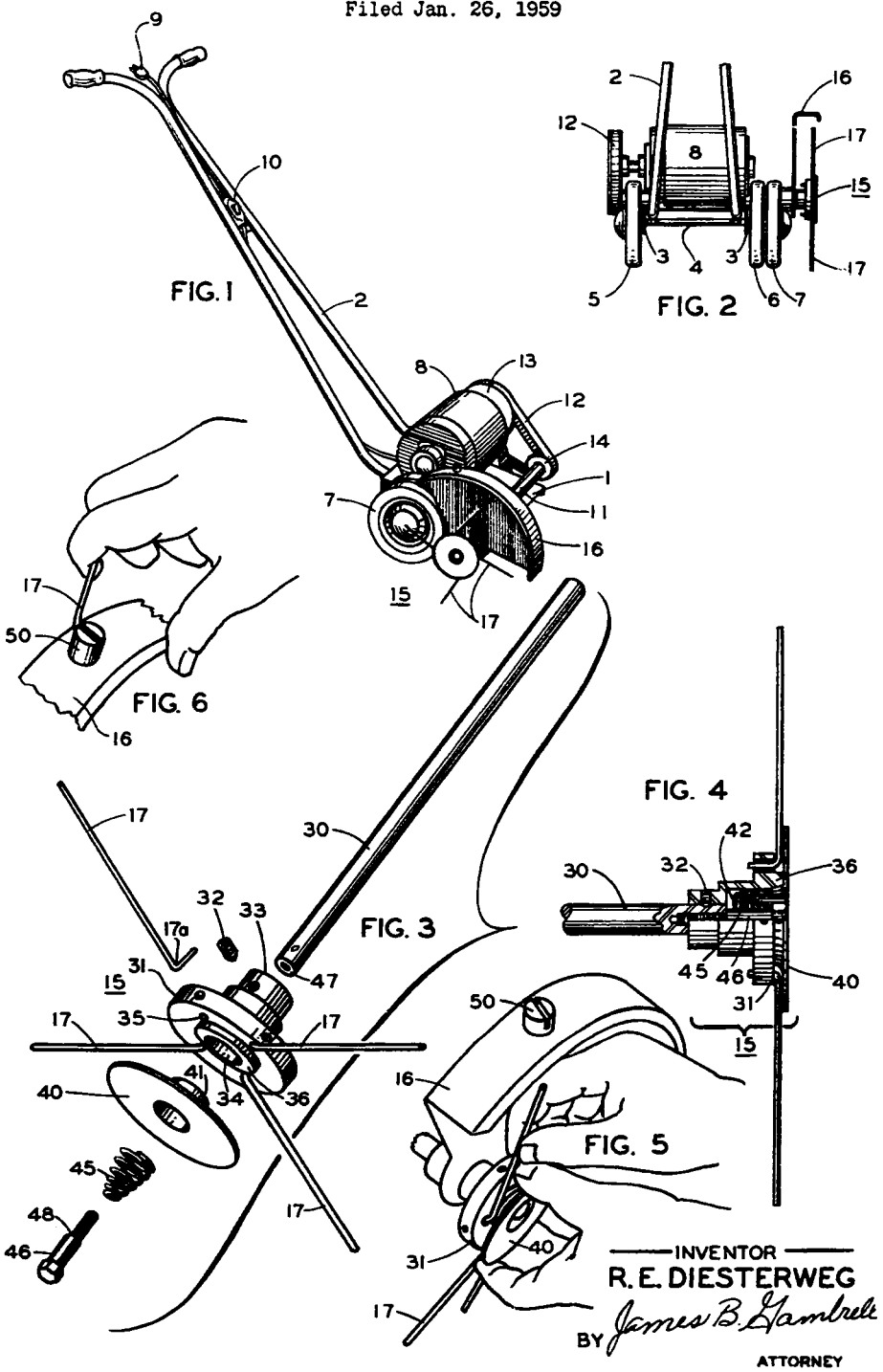
INVENTOR
R. E. DIESTERWEG
BY James B. Gambrell
ATTORNEY

United States Patent Office 3,018,602
Patented Jan. 30, 1962

3,018,602
LAWN EDGER
Roland Earl Diesterweg, 2022 W. Broadway, Enid, Okla.
Filed Jan. 26, 1959, Ser. No. 788,950
4 Claims. (Cl. 56—295)

This invention relates broadly to devices for trimming grass and weeds from locations adjacent sidewalks, curbs, driveways, flower beds and the like, and more particularly to power operated trimmers employing wire type cutting elements.

The trimming of grass next to driveways, walks and the like has long been a difficult undertaking, a thorn in the side of good husbandry. It is an observable fact that failure to carefully trim such contiguous areas mars what would otherwise be an appealing yard. Thus, there have been many attempts in the past to develop a tool of simple construction which operates well, has a low first cost, and requires only nominal maintenance. Experience to date has pretty well convinced those in the field that a lawn edging device must be power actuated to really operate efficiently. Even within the ambit of this restriction, however, no entirely satisfactory device has been forthcoming. More recently devices began to break away from the use of disk type blades with their relative inflexibleness and tendency to break. The influence of disk-type farm machinery on edging devices, even those not called on to do yeoman work, has finally been overcome to some extent by devices such as that disclosed in Patent 2,538,230 issued to Sam H. Boggs for a lawn trimmer. This patent discloses an edger which utilizes a plurality of wires for cutting elements—although the wire cutters do not cut the grass so much as they tend to shear it. Be that as it may, the fact is that such flexible wire cutting elements work well to provide a narrow edged area adjacent a non-lawn area. More recently still, certain disadvantages of prior art devices, as exemplified by the above identified patent, were overcome by the device disclosed by H. M. Lyle in Patent 2,791,077. For example, the earlier Boggs apparatus required the removal of a washer and nut to replace the wire cutting elements, whereas Lyle discloses a spring loaded plate movable to permit the support loops of a new wire cutting element to be placed over upstanding studs. Thus, the Lyle invention represents an improvement over Boggs-type devices in some features. On the other hand, it retrogresses as to other features. For example, the inability to place the cutting elements adjacent a curb or house wall, as can be accomplished with devices similar to the Boggs device, is a serious limitation.

The present invention represents an improvement over prior art devices, as exemplified by the foregoing patent disclosures, in a number of particulars. Among other things, the instant invention acts to employ the best concepts in such exemplary disclosures and to incorporate them, along with others, into an improved power driven lawn edger. In accordance with this design, the present invention utilizes a spring biased plate with the spring retained interior of the plate whereby the plane of rotation for the wire cutting elements is closely adjacent the outermost part of the lawn edger. This permits the edger to be used close to walls, curbs and the like—something not possible with previous devices employing spring-biased plates. The plate and spring are positioned with respect to the hub assembly of the edger by a machine bolt having a preformed shoulder thereon. This overcomes one of the problems incident to externally mounted springs, that is, locking the assembly and, at the same time, preventing the threads on the exposed member from being stripped during repeated manipulation.

The retaining plate is formed with a cup like portion which contains the spring and which depends into the hub member of the edger. The large external bearing area on this member prevents the aperture in the plate from being enlarged by rough handling and the inherent vibrations generated as the edger is operated. Prior art devices, particularly those employing external springs, have been subject to this debility. Naturally enough, such enlargement increases the danger of a wire cutting element flying off during the use of some of the prior art devices.

This improved plate assembly is coupled with a simple design for the cutting elements and elimination of studs and other types of specially formed wire support members. A number of apertures are formed in the hub of the edger and a short right angle bend in a wire cutting element fits therein. The plate rests closely adjacent the wire cutting elements thereby positively retaining them in their respective apertures. This type of construction not only reduces the amount of wire needed for cutting elements by approximately one-third, but eliminates the more expensive looped ends. Then too, small movements of the retaining plate cannot permit the wires to work loose, as is possible in some prior art devices.

Though the cutting elements are generally constructed from No. 12 ga. wire, other materials may be used. As a general rule, the cutting elements are obtainable preformed, but if not available, they may be formed with the aid of a bending jig mounted on the safety shield of the lawn edger.

Another feature of the present invention relates to the use of dual wheels or an extra-wide wheel on the cutting side of the edger. In trimming operations next to narrow curbs, it is desirable that the support wheel adjacent the cutting elements be as close to the elements as possible so that the lawn edger may be rolled along the curb. On the other hand, in edging flower beds and like, unless the support wheel on the cutting element side is somewhat displaced from the plane of the cutting elements, the edger tends to "cartwheel" into the flower bed as corners are turned. It is to satisfy these conflicting tendencies that the present invention employs dual wheels on the cutting side of the edger to vary the point of support therefor. Of course, a single wide wheel could work just as well, but economics dictates the use of two wheels in the disclosed embodiment.

These and other objects and features may be more fully understood when the following detailed description is read with reference to the drawings in which—

FIG. 1 is a perspective drawing of the improved lawn edger;

FIG. 2 is a rear view of the lower part of the lawn edger of FIG. 1;

FIG. 3 is an exploded perspective on an enlarged scale of the cutting element assembly of the present invention;

FIG. 4 is a partial cut away view of the cutting element assembly taken at right angles to the longitudinal axis thereof;

FIG. 5 is a partial perspective on an enlarged scale of the edger of FIG. 1 illustrating the insertion and removal of wire cutting elements; and FIG. 6 is a partial perspective of the wire forming jig illustrating its use to form individual cutting elements.

Looking generally to FIGS. 1 and 2, the lawn edger may be seen to comprise a support member 1 to which is affixed a more or less conventional handle 2. The support member or frame 1 has depending axle support members 3 which support an axle 4 which in turn supports wheels 5 and 6—7. Mounted on the platform 1 is an electric motor 8 which may be powered by any 110 volt source that is connected to plug 9; provided manual switch 10, supported adjacent handle 2, is operated. The shaft 30 of the cutting element assembly is rotatably supported by bearing sleeve 11 fixedly attached to the platform 1 forward of the motor 8 and parallel to the shaft thereof. The shaft 30 of the cutting element assembly is rotatably connected to the motor 8 at one end through belt 12 cooperating with pulleys 13 and 14 which are fixedly supported on the shaft of the motor 8 and shaft 30, respectively.

Shaft 30 extends outwardly beyond its bearing member 11 and on the right side or end of the lawn edger (looking from the operator's position, see FIG. 2) to support at its other end the cutting element assembly 15 for rotation. The cutting element assembly 15 cooperates with a safety shield 16 which is supported by support member 11 (specific means not shown) to overlay the cutting elements (see FIG. 2). Shield 16 acts to prevent foreign objects picked up by the cutting elements during operation from striking the operator of the lawn edger.

The cutting element assembly 15 depicted most clearly in FIGS. 3 and 4, comprises an apertured hub member 31, a plate 40, and a helical spring 45. The apertured hub member 31 is fixedly retained on shaft 30 by a set screw 32 cooperating with the left end or side (with respect to the orientation of FIG. 4) of the hub member 31. Beyond the aperture 33 in the left end of hub member 31, which receives shaft 30, the right end or side has formed therein a circular aperture 34 of greater radius to cooperate with a part of plate 40 as will be explained hereinafter. The right end of the hub member 31 also has four apertures 35 formed at approximately 90° intervals about its periphery and parallel to the longitudinal axis 18 of the cutting assembly 15 which apertures receive ends of cutting elements 17. Intermediate apertures 35 and aperture 34 is a raised circular shoulder 36 which cooperates with plate 40 to hold the cutting elements 17 in their operating positions.

The plate 40 is an apertured circular member having a cup-shaped part or bearing member 41 formed on its left side (with respect to FIG. 4). The cup-shaped or cylindrically-shaped member 41, has an inner shoulder on its left side which acts to retain spring 45.

To assemble the cutting element assembly 15, the cup-shaped part 41 of the plate 40 fits into and cooperates with the aperture 34 of hub member 31. The left end (with respect to FIG. 4) of the cylindrical part 41 may rest on the shoulder formed at the juncture of apertures 33 and 34 in hub member 31. With the part 41 adjacent this interior shoulder of hub member 31, the left side of plate 40 rests on shoulder 36 to retain cutting elements 17 in their apertures 35. Since the raised shoulder 36 is greater than the diameter of cutting elements 17, it permits them to be retained between the plate 40 and hub member 31 without binding. They are free to pivot in their bearing apertures 35 (see FIG. 4).

After the plate 40 is in place with respect to the hub member 31, it is held there by the spring 45 cooperating with bolt or locking member 46, lip 42 on plate 40, and the end 47 of shaft 30.

The spring 45 is disposed axially interiorly of plate 40 and fits inside of the depending cup member 41 of plate 40 and rests against the inner lip 42 thereof. The bolt 46 goes through the spring 45 and its head rests against the right end of the spring 45. The threaded end of the bolt 46 is caused to engage the threaded longitudinal aperture in the end of shaft 30 thereby restraining the spring between the lip 42 of plate 40 and the head of bolt 46. The aperture defined by the lip 42 on plate 40 is approximately equal to the diameter of the shoulder 48 on bolt 46. Thus, as the bolt 46 is threaded into the end of shaft 30, the shoulder 48 abuts surface 47 on shaft 30 to lock the cutting element assembly 15 to shaft 30. The position of shoulder 48 and the length of spring 45 are chosen to hold plate 40 against shoulder 36 without undue compression of spring 45.

Once the cutting element assembly 15 is assembled, the insertion of cutting elements 17 is a simple matter. Looking particularly to FIG. 5, it can be seen that the plate may be pulled away from the shoulder 36, against the compresion of spring 45, and the right angle bend 17a of a wire cutter inserted in an aperture 35. Release of the plate 40 then locks the cutter securely in place. Worn out cutter elements, of course, may be removed in the same way. The added safety in the present construction over prior art devices is apparent. The plate 40 must be moved away from the shoulder 36 a substantially greater distance than that of the diameter of the wire elements 17. Hence, the probability of a cutting element being thrown out during operation is much more remote than is the case with certain prior art devices.

If preformed blades are not available, a jig 50 is provided to allow them to be formed out of available wire. A straight piece of 12 ga. wire, for example, is cut and one end inserted in the groove of jig 50. With the end of the wire lying fully in the groove, the right angle bend 17a is formed. The length of the groove in the jig 50 is chosen to give the proper length to the part of the element which fits into an aperture 35.

As noted earlier, dual wheels 6 and 7 are provided on the cutting side of the lawn edger to solve the problem of narrow curb and flower bed edging. For such use, wheel 7 should be as close to the plane of the cutting elements as is mechanically feasible.

While the present invention has been described with respect to a preferred embodiment thereof, numerous other arrangements and variations will be apparent to those skilled in the art without departing from the scope of the invention. Therefore, it is to be remembered that this description is only illustrative, the scope being limited only by the express limitations in the accompanying claims.

What is claimed is:

1. A cutting element for a power operated lawn mower or the like comprising, a rotatable support having an outer face, wire-like cutter elements pivotally and radially attached to said support and engaging said face, a plate member contacting said cutter elements, means having a head extending through said plate and axially secured to said support, and spring means between said head and said plate for resiliently urging said plate against said cutter elements.

2. A cutter element for a power operated lawn mower or the like comprising, a rotatable support having an outer face, a plate member positioned adjacent and substantially parallel to said face, wire-like cutter elements radially and pivotally attached to said support and positioned between said face and said plate, means having a head extending through said plate and axially secured to said support, and spring means disposed axially interiorly of said plate cooperating with said head and said plate for resiliently urging said plate toward said face.

3. A cutter element for a power operated lawn mower or the like in accordance with claim 2 wherein said cutting elements are supported in a plurality of apertures formed in the outer face of said rotatable support.

4. A cutter element for a power operated lawn mower or the like in accordance with claim 2 wherein said spring means cooperating with said head and said plate is a helical spring and said plate is centrally recessed so that said spring lies axially interiorly of said plate.

References Cited in the file of this patent

UNITED STATES PATENTS

| | | |
|---|---|---|
| 2,538,230 | Boggs | Jan. 16, 1951 |
| 2,539,619 | Goodall | Jan. 30, 1951 |
| 2,634,667 | Woolwine | Apr. 14, 1953 |
| 2,663,137 | Asbury | Dec. 22, 1953 |
| 2,676,448 | Limberger | Apr. 27, 1954 |
| 2,791,077 | Lyle | May 7, 1957 |
| 2,888,993 | Dunning | June 2, 1959 |